United States Patent
Dyke et al.

(10) Patent No.: US 8,672,753 B2
(45) Date of Patent: *Mar. 18, 2014

(54) VIDEO GAME INCLUDING EFFECTS FOR PROVIDING DIFFERENT EXPERIENCES OF THE SAME VIDEO GAME WORLD AND A STORAGE MEDIUM STORING SOFTWARE FOR THE VIDEO GAME

(75) Inventors: Erick S. Dyke, Orlando, FL (US);
Shawn Leaf, Orlando, FL (US);
Timothy D. Schwalk, Orlando, FL (US)

(73) Assignee: Nintendo Co., Ltd., Kyoto (JP)

( * ) Notice: Subject to any disclaimer, the term of this patent is extended or adjusted under 35 U.S.C. 154(b) by 308 days.

This patent is subject to a terminal disclaimer.

(21) Appl. No.: 12/461,571

(22) Filed: Aug. 17, 2009

(65) Prior Publication Data

US 2009/0312099 A1 Dec. 17, 2009

Related U.S. Application Data

(62) Division of application No. 11/125,409, filed on May 10, 2005, now Pat. No. 7,905,779.

(60) Provisional application No. 60/569,237, filed on May 10, 2004.

(51) Int. Cl.
*A63F 13/00* (2006.01)

(52) U.S. Cl.
USPC ................................. 463/30; 463/31; 463/35

(58) Field of Classification Search
USPC .............. 463/1, 30, 31, 32, 33, 34, 35, 36–38
See application file for complete search history.

(56) References Cited

U.S. PATENT DOCUMENTS

| 5,993,318 | A | 11/1999 | Kousaki |
| 6,290,602 | B1 | 9/2001 | Kawano ........................ 463/23 |
| 6,406,370 | B1 | 6/2002 | Kumagai ....................... 463/31 |
| 6,413,163 | B1 | 7/2002 | Yamauchi et al. |
| 6,475,084 | B2 | 11/2002 | Tanibuchi et al. ................ 463/3 |
| 6,738,067 | B2 | 5/2004 | Hayama et al. ............... 345/474 |
| 6,935,954 | B2 | 8/2005 | Sterchi ........................... 463/31 |
| 2005/0113158 | A1* | 5/2005 | Sterchi et al. ..................... 463/3 |

FOREIGN PATENT DOCUMENTS

| EP | 1097738 A2 | 5/2001 |
| JP | 10-137445 | 5/1998 |
| JP | 2000-102672 | 4/2000 |
| JP | 2002346207 A2 | 12/2002 |

OTHER PUBLICATIONS

Playstation 2, Gran Turismo 3 A-spec Game Manual, Apr. 28, 2001.*

(Continued)

*Primary Examiner* — Damon Pierce
(74) *Attorney, Agent, or Firm* — Nixon & Vanderhye, P.C.

(57) ABSTRACT

In a video game, various effects are used to convey the experience of a game world of different kinds of game characters and game objects. For example, if a game character is a dog, a visual effect may be used to convey a dog's red-green color blindness. If a game character is a mouse, another visual effect may be used convey a mouse's blurry vision.

4 Claims, 20 Drawing Sheets
(11 of 20 Drawing Sheet(s) Filed in Color)

(56) References Cited

OTHER PUBLICATIONS

Alien versus Predator 2 video game, 2002, http://www.youtube.com/watch?v=afx8X7ro4kU&feature=related, http://www.youtube.com/watch?v=z0oxiXJSWx8, http://www.youtube.com/watch?v=a64ABqtxs8k&feature=related, and http://www.youtube.com/watch?v=VJEMuT_sLfA.*
Madden NFL 2002 video game, 2001, EA Sports.*
Madden NFL 2001 video game, 2000, EA Sports.*
Dualshock Analog controller, 1999, Sony Playstation, http://us.playstation.com/ps/accessories/dualshock-analog-controller-ps.html.*
Aliens vs. Predator 2 video game manual, Sierra, Monolith Productions, released Oct. 30, 2001.*
"Soul Calibur 2 (NGC)," <http://www.videogamecity.com>, 2004.
International Search Report App. No. PCT/US05/15961, dated Oct. 13, 2006.
Spyhunter, Midway games, 2001, game manual.
Sulie, Ivan. Splinter Cell Review, Feb. 18, 2003, Online: http://pc.ign.com/386/386386p1.html.
Messiah (video game), Wikipedia, the free encyclopedia, Online: http://en.wikipedia.org/wiki/Messiah_(video_game), Sep. 11, 2006.
Wolpow, Erik, Messiah Review, Gamespot, Apr. 7, 2000.
Ajami, Amer, Tom Clancy's Ghost Recon Review, Gamespot, Nov. 26, 2002, Online: http://www.gamespot.com/xbox/action/tomclancysghostrecon/review.html?sid=2898704.
First-person shooter, Wikipedia, the free encyclopedia, Online: http://en.wikipedia.org/wiki/Frist-person_shooter, Sep. 15, 2006.
Tom Clancy's Ghost Recon, Wikipedia, the free encyclopedia, Online: http://en.wikipedia.org/wiki/Tom_Clany's_Ghost_recon:_Jungle_Storm, 2001.
Office Action dated Feb. 16, 2011 in JP Application No. 2007-513264 with English-language translation.
LOGiN, Enterbrain, Inc., Sep. 1, vol. 19/No. 9/Serial No. 294, pp. 100-101 (an article on "Messiah"), Sep. 1, 2000.
Famitsu Xbox, Enterbrain, Inc., Aug. 1, 2003, vol. 2/No. 8/Serial No. 16, pp. 032-033 (an article on "Ghost Recon").
Official Navigation Guide for Siren, Softbank Publishing, Jan. 30, 2004, first version, p. 014, p. 027, ISBN4-7973-2567-4.
Perfect Guide for Echo Night #2; Nemuri no Shihaisha (The Master of Slumber), Softbank Publishing, Aug. 10, 1999, first version, p. 12, ISBN4-7973-0987-3.

* cited by examiner

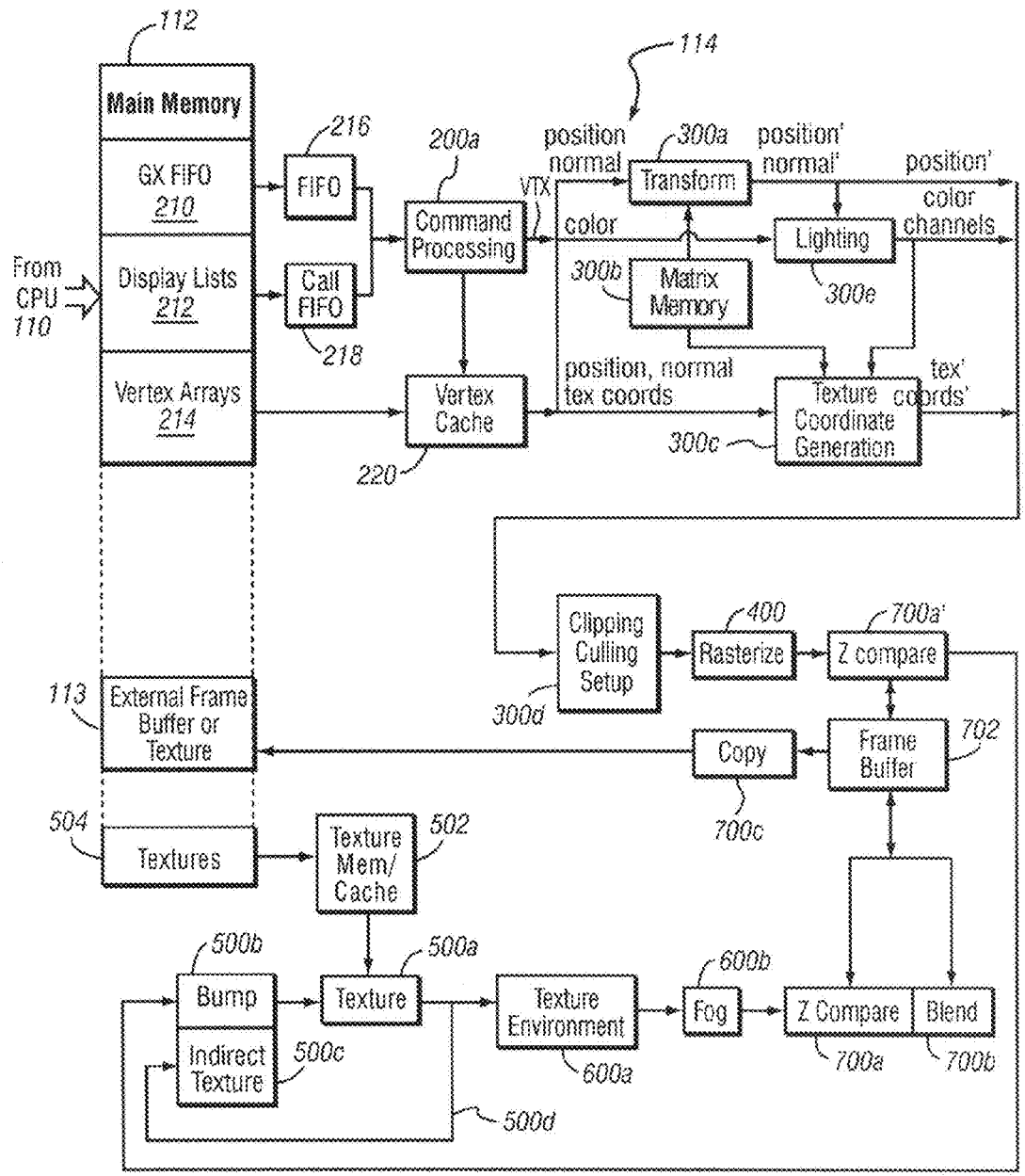
Fig. 5  EXAMPLE GRAPHICS PROCESSOR FLOW

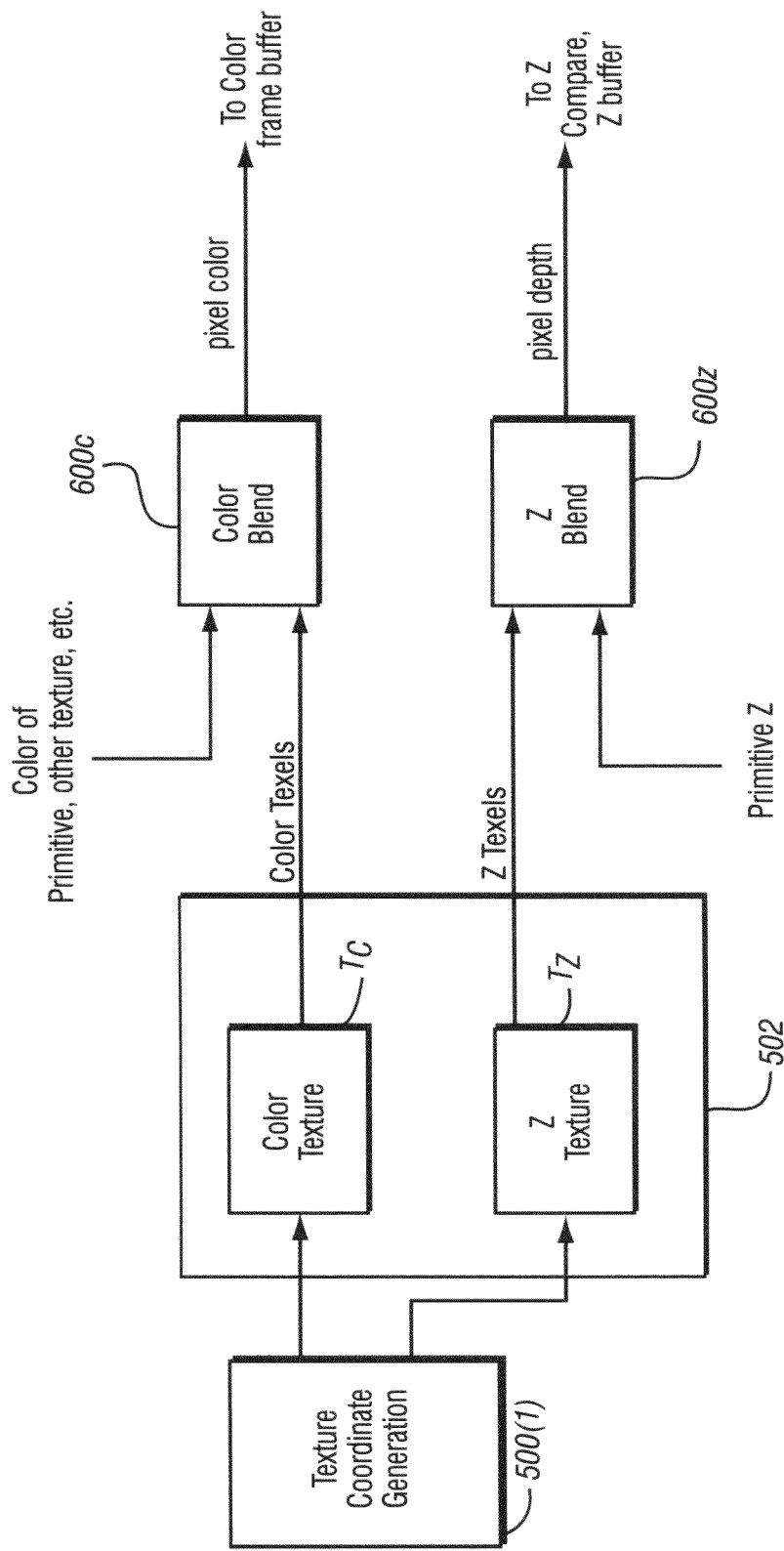
Fig. 8  EXAMPLE Z TEXTURING

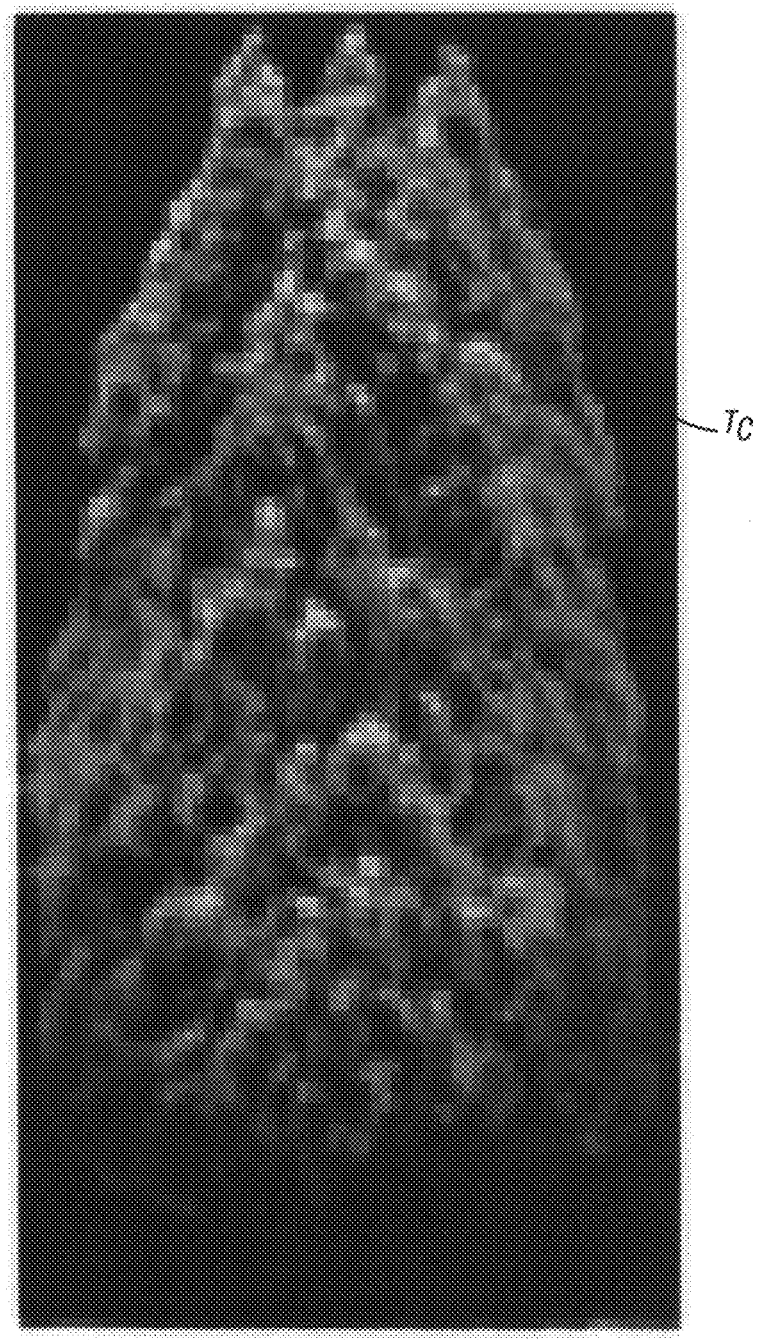
Fig. 9A EXAMPLE COLOR TEXTURE

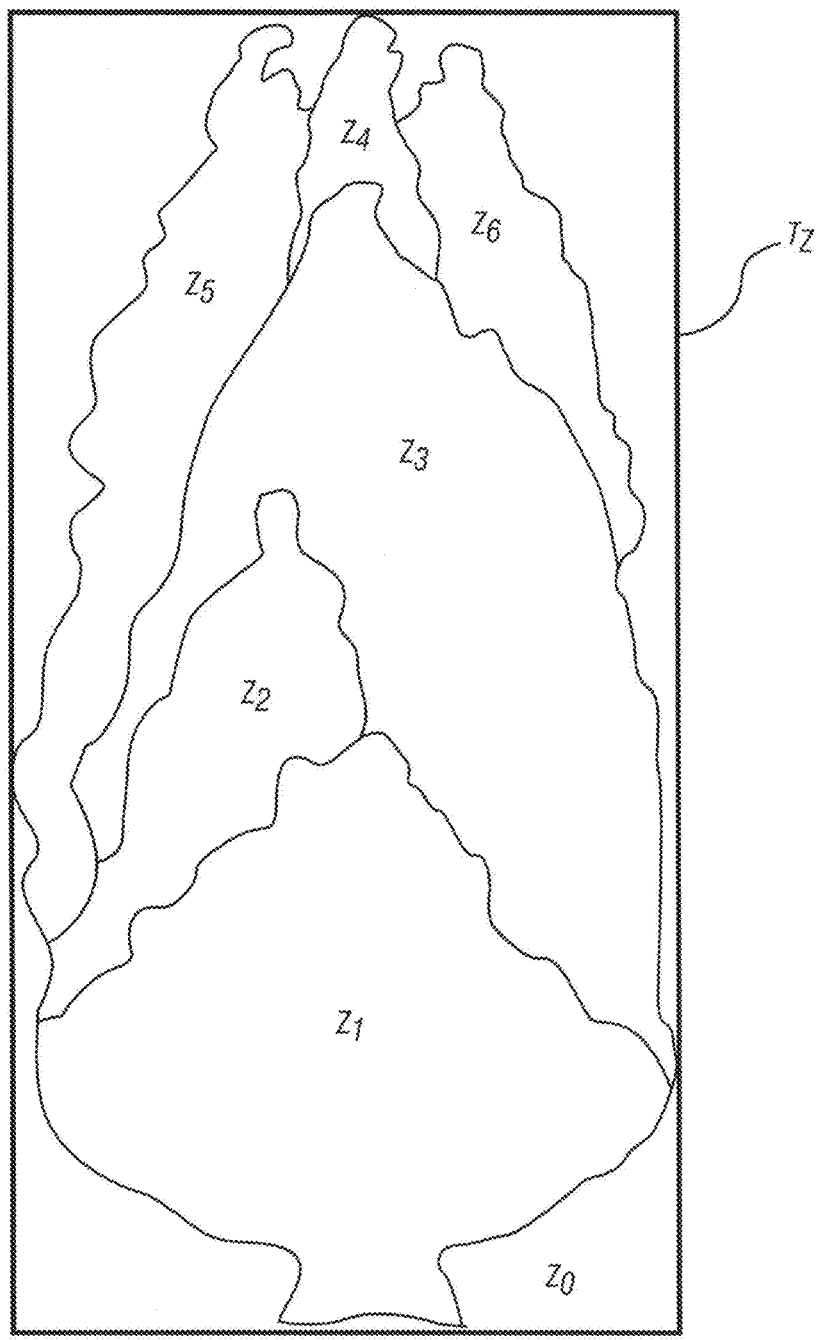
*Fig. 9B* EXAMPLE Z TEXTURE

VIDEO GAME INCLUDING EFFECTS FOR PROVIDING DIFFERENT EXPERIENCES OF THE SAME VIDEO GAME WORLD AND A STORAGE MEDIUM STORING SOFTWARE FOR THE VIDEO GAME

CROSS-REFERENCE TO RELATED APPLICATIONS

This application is a divisional of application Ser. No. 11/125,409, filed May 10, 2005, which claims the benefit of U.S. provisional application No. 60/569,237, filed May 10, 2004. The contents of each of these applications are incorporated herein in their entirety.

BACKGROUND AND SUMMARY

This application generally relates to a video game and, more particularly, to a video game including effects for providing different first person experiences of the same video game world. The application also describes a storage medium storing software for such a video game.

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as a television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional (3D) graphics just a few years ago were mostly limited to expensive specialized flight simulators, high-end graphics workstations and supercomputers. The public saw some of the images generated by these computer systems in movies and expensive television advertisements, but most couldn't actually interact with the computers doing the graphics generation. All this has changed with the availability of relatively inexpensive 3D graphics platforms such as, for example, the Nintendo GameCube® and various 3D graphics cards now available for personal computers. It is now possible to interact with exciting 3D animations and simulations on relatively inexpensive computer graphics systems in home or office.

This application describes an example video game that can be played on 3D graphics platforms. Although not limited in this respect, the example video game is a first person game in which the player plays the game as if he or she looking out of his or her own eyes. The video game involves a ghost that is capable of "possessing" various hosts such as game characters and game objects in order to accomplish game objectives. When the ghost possesses a host, the game view is shifted to that of the possessed host. That is, the player sees the game world through the eyes or viewpoint of the possessed host. In order to allow the player to feel more like the host that has been possessed, the example video game enables the player to experience the world based on characteristics of the possessed host. For example, visual effects such as filters may be used to convey the worldviews of the hosts that the ghost possesses. Thus, if the ghost possesses a dog, a visual effect may be used to convey a dog's red-green color blindness. In this case, the player of the first person game can view the scene more like a dog would view the scene. If the ghost possesses a mouse, another visual effect may be used convey a mouse's blurry vision. In this case, the player can view the scene more like a mouse would view the scene.

By way of example, the dog's red-green color blindness may be realized by combining the red and green color channels when the 3D graphics platform generates the game display. The mouse's blurry vision may be realized by using a blur to blur the scene viewed by the mouse. Generally speaking, the visual effects described herein can be implemented using a variety of techniques including, but not limited to, combining different color channels, blurring by depth, enhancing or reducing contrast, performing image warping, overlays, texturing, lighting, fog effects and the like.

The concepts described herein are not limited to vision effects. By way of example, certain audio effects may be used to convey to a player how a particular host might hear certain sounds. If the ghost possesses a dog, audio effects may be used to convey how a dog hears sounds developed during game play. Similarly, if the ghost possesses a mouse, other audio effects may be used to convey how a mouse hears sounds developed during game play. These audio effects may be used in combination with or separately from the above-described vision effects.

By way of further example, many game systems are arranged to provide tactile effects to players. These tactile effects can be provided by vibration devices mounted in the game controllers used by players. The concepts described herein can be applied to such tactile effects by conveying to a player how a particular host might sense certain forces applied thereto. For example, a mouse and a human would sense the same force differently and the game system can take these differences into account by generating tactile effects whose strength is based at least in part on the characteristics of the character or object to which the force is applied. These tactile effects may be used in combination with, or separately from, the above-described vision and audio effects.

These and other features and advantages will be better and more completely understood by referring to the following detailed description of example embodiments in conjunction with the drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 5 is an example logical flow diagram of the FIG. 4 graphics and audio processor;

FIG. 8 is a block diagram of an example z texturing technique;

FIG. 9A shows an example color texture;

FIG. 9B shows an example z texture;

DETAILED DESCRIPTION OF EXAMPLE EMBODIMENTS

Figure 1:
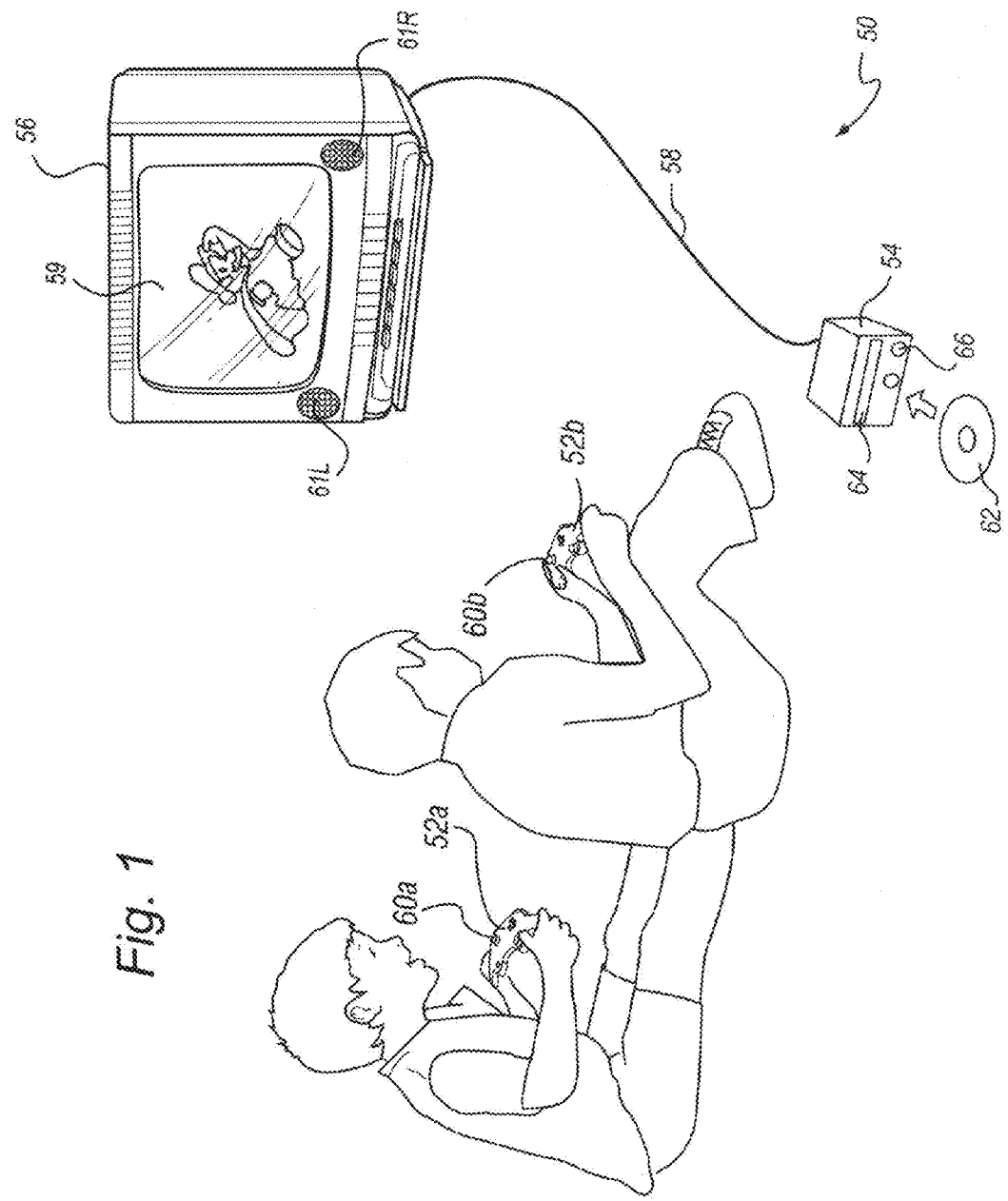
FIG. 1 is an overall view of an example interactive computer graphics system.

FIG. 1 shows an example interactive 3D computer graphics system 50 on which the video game described herein may be played. System 50 can be used to play interactive 3D video games with interesting stereo sound. It can also be used for a variety of other applications. In this example, system 50 is capable of processing, interactively in real time, a digital representation or model of a 3D world. System 50 can display some or all of the world from any arbitrary viewpoint. For example, system 50 can interactively change the viewpoint in response to real time inputs from handheld controllers 52*a*, 52*b* or other input devices. This allows the game player to see the world through the eyes of someone within or outside of the world. System 50 can be used for applications that do not require real time 3D interactive display (e.g., two-dimensional (2D) display generation and/or non-interactive display), but the capability of displaying quality 3D images very quickly can be used to create very realistic and exciting game play or other graphical interactions.

To play a video game or other application using system 50, the user or player first connects a main unit 54 to his or her color television set 56 or other display device by connecting a cable 58 between the two. Main unit 54 produces both video signals and audio signals for controlling color television set 56. The video signals control the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52*a*, 52*b* to supply inputs to main unit 54. Controls 60*a*, 60*b* can be used, for example, to specify the direction (up or down, left or right, closer or further away) that a character displayed on television 56 should move within a 3D world. Controls 60*a*, 60*b* can also be used to provide input for other applications (e.g., menu selection, pointer/cursor control, etc.). Controllers 52 can take a variety of forms. In this example, controllers 52 each include controls 60 such as joysticks, push buttons and/or directional switches. Controllers 52 may be connected to main unit 54 by cables or wirelessly via electromagnetic (e.g., radio or infrared) waves.

Each controller 52 may also contain one or more vibration devices (not shown) that are selectively driven in accordance with control signals from main unit 54. When driven, these vibration units produce vibrations that are transmitted to the hand(s) of the player holding the controller. In this way, tactile sensations may be provided to players when vibration generating events occur during game play. Examples of vibration generating events include collisions, movement over a rough surface, accelerations, etc. Additional details of example controllers using vibration devices may be found in U.S. Pat. No. 6,676,520 and application Ser. No. 09/814,953, the contents of each of which are incorporated herein in their entirety.

To play an application such as a game, the user selects an appropriate storage medium 62 storing the video game or other application he or she wants to play, and inserts that storage medium into a storage medium receiving portion 64 in main unit 54. Storage medium 62 may, for example, be a specially encoded and/or encrypted optical and/or magnetic disk. Of course, in other implementations of the graphics system other memory devices such as semiconductor memories may be used. In still other implementations, the user may connect over a communication network such as the Internet to a remote computer storing game software. In the FIG. 1 implementation, the user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
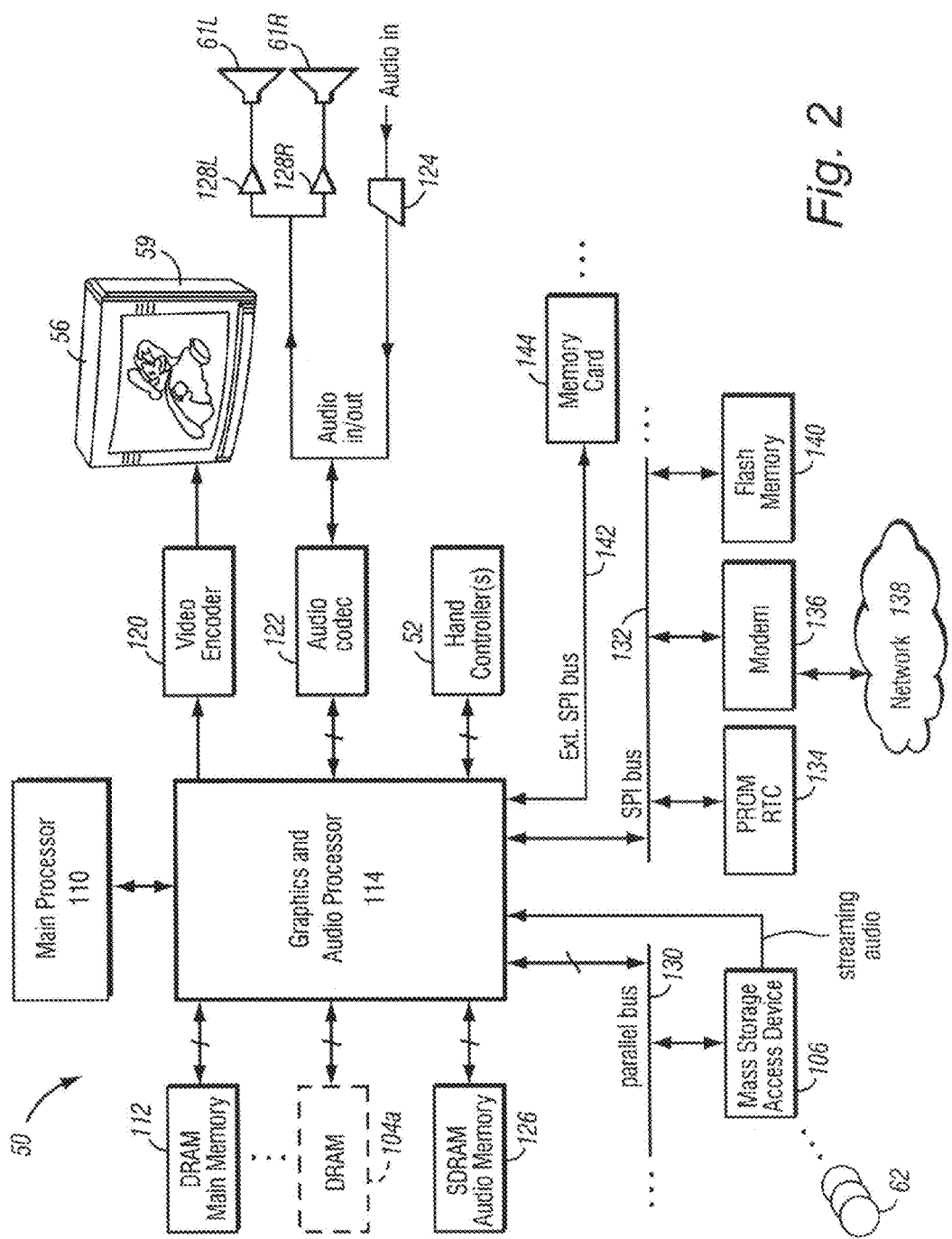
FIG. 2 is a block diagram of the FIG. 1 example computer graphics system.

FIG. 2 shows a block diagram of example components of system 50. The primary components include a main processor (CPU) 110, a main memory 112 and a graphics and audio processor 114. In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with. various additional devices that may be present within system 50. For example, a parallel digital bus 130 may be used to communicate with mass storage access device 106 and/or other components. A serial peripheral bus 132 may communicate with a variety of peripheral or other devices including, for example a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
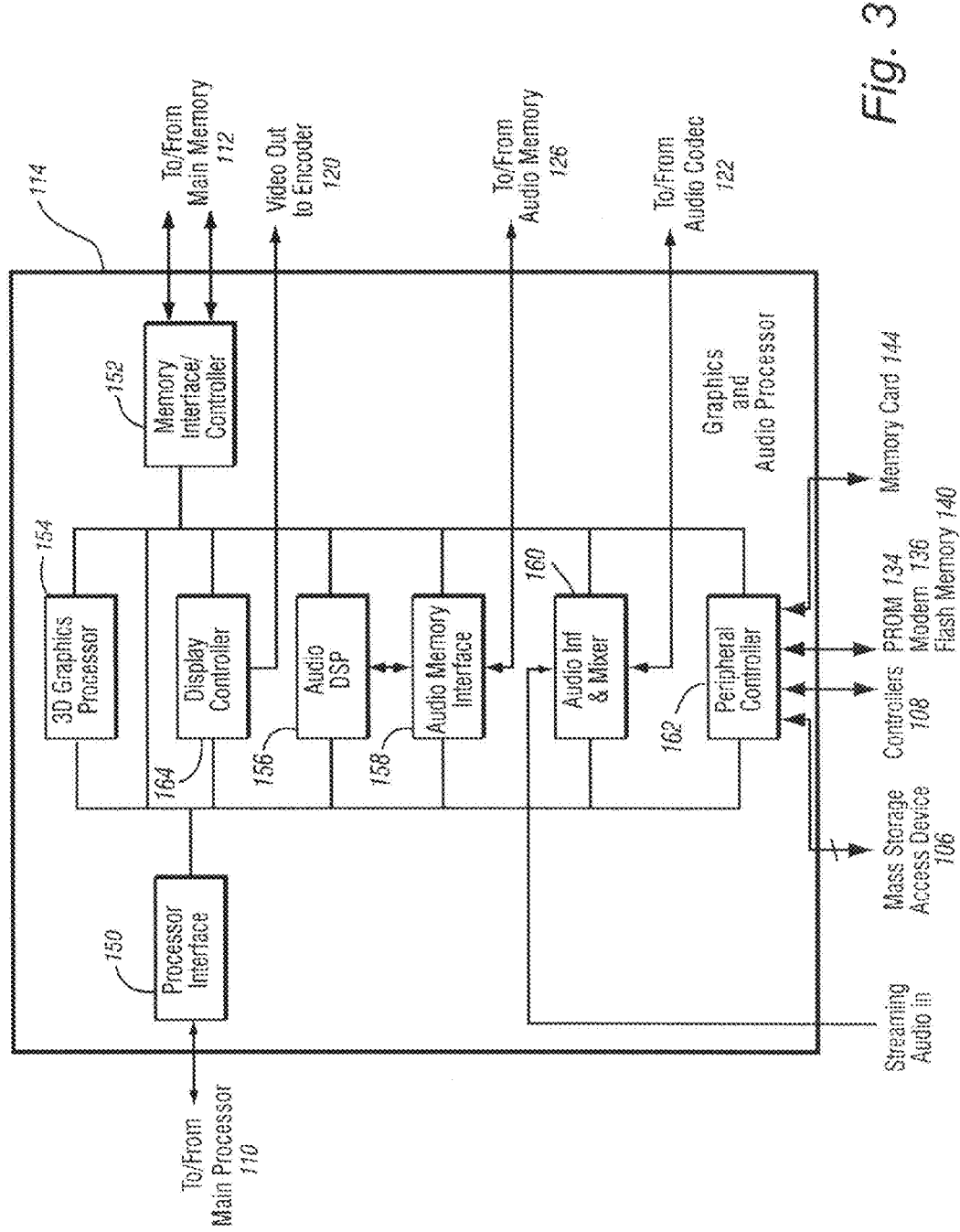
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes a processor interface 150, a memory interface/controller 152, a 3D graphics processor 154, an audio digital signal processor (DSP) 156, an audio memory interface 158, an audio interface and mixer 160, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
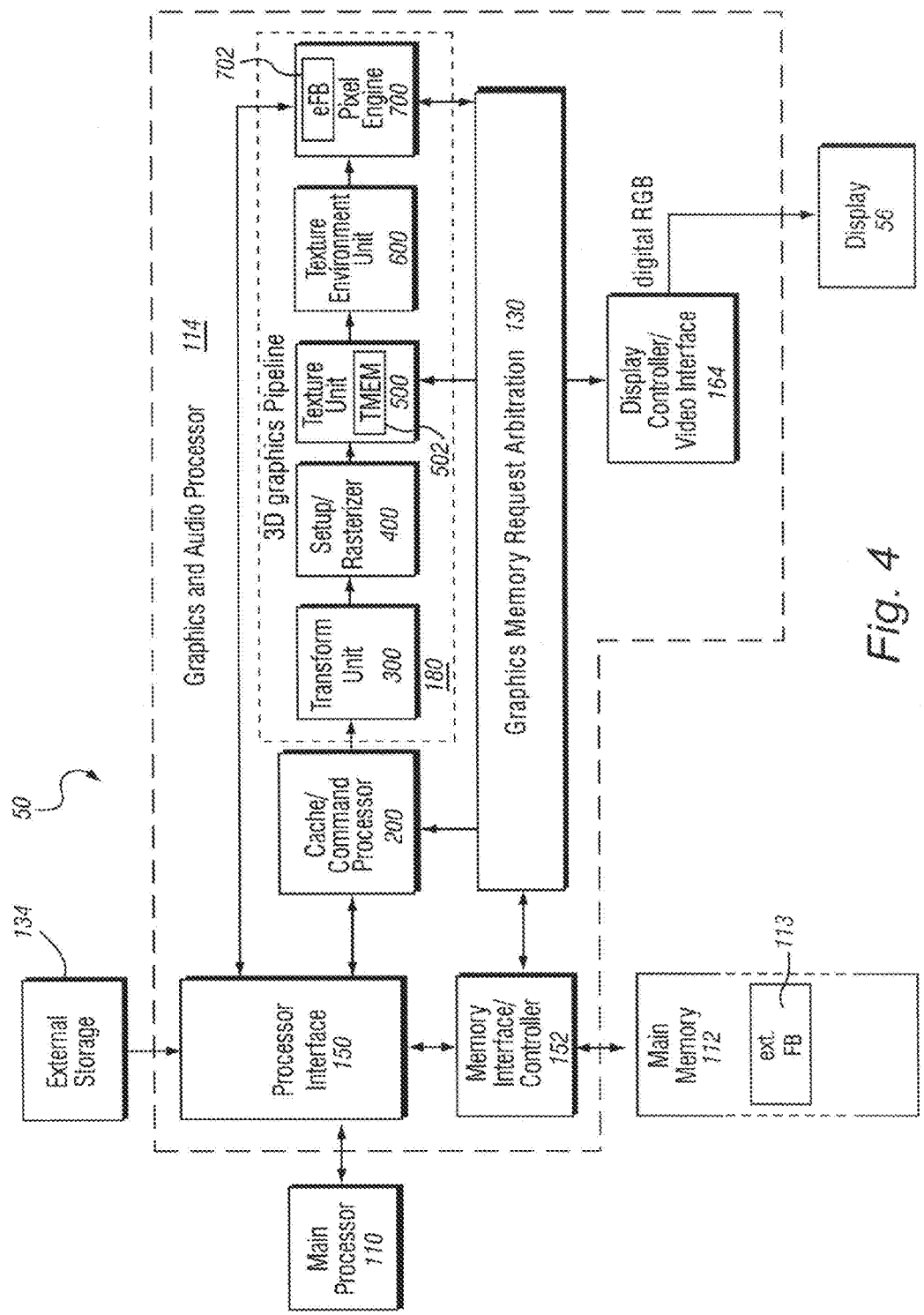
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache to minimize memory latency, and also has a write-gathering buffer for uncached data streams targeted for the graphics and audio processor 114. The write-gathering buffer collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches: (1) command streams from main memory 112 via an on-chip FIFO memory buffer 216 that receives and buffers the graphics commands for synchronization/flow control and load balancing, (2) display lists 212 from main memory 112 via an on-chip call FIFO memory buffer 218, and (3) vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include: a transform unit 300, a setup/rasterizer 400, a texture unit 500, a texture environment unit 600, and a pixel engine 700.

Transform unit 300 performs a variety of 2D and 3D transforms and other operations 300*a* (see FIG. 5). Transform unit 300 may include one or more matrix memories 300*b* for storing matrices used in transformation processing 300*a*. Transform unit 300 transforms incoming geometry per vertex from object or model space to homogenous eye space using a Modelview Matrix, and (after clipping 300*d* in clip space if desired) performs perspective scaling and screen coordinate conversion to provide resulting screen space (x, y, z) triplets for rasterization. Transform unit 300 also transforms incoming texture coordinates and computes projective texture coordinates (300*c*). Lighting processing 300*e* also performed by transform unit 300*b* provides per vertex lighting computations for up to eight independent lights in one example embodiment. Transform unit 300 can also perform texture coordinate generation (300*c*) for embossed type bump mapping effects.

Setup/rasterizer 400 includes a setup unit which receives vertex data from transform unit 300 and sends triangle setup information to one or more rasterizer units (400*b*) performing edge rasterization, texture coordinate rasterization and color rasterization.

Texture unit 500 (which may include an on-chip embedded DRAM texture memory (TMEM) 502) performs various tasks related to texturing including for example: retrieving color and z textures 504 from main memory 112; texture processing (500*a*) including, for example, multi-texture handling, post-cache texture decompression, texture filtering (e.g., resampling to provide non-uniform and/or non-linear texture mapping), embossing, shadows and lighting through the use of projective textures, and BLIT with alpha transparency and depth; bump map processing for computing texture coordinate displacements for bump mapping, pseudo texture and texture tiling effects (500*b*); and indirect texture processing (500*c*). Generally speaking, texturing modifies the appearance of each location of a surface using some image, function or other data. As an example, instead of precisely representing the geometry of each brick in a brick wall, a two-dimensional color image of a brick wall can be applied to the surface of a single polygon. When the polygon is viewed, the color image appears where the polygon is located.

Texture unit 500 outputs filtered texture values to the texture environment unit 600 for texture environment processing (600*a*). Texture environment unit 600 blends polygon and texture color/alpha/depth, and can also perform texture fog processing (600*b*) to achieve inverse range based fog effects. Texture environment unit 600 can provide multiple stages to perform a variety of other interesting environment-related functions based for example on color/alpha modulation, embossing, detail texturing, texture swapping, clamping, and depth blending. Briefly, texture environment unit 600 in the example embodiment combines per-vertex lighting, textures and constant colors to form the pixel color and then performs fogging and blending including z blending for z textures. In an example embodiment, the color and alpha components have independent texture environment unit circuitry with independent controls. One set of texture environment color/alpha-combiners implemented in hardware can be reused over multiple cycles called texture environment stages (each having independent controls) to implement multi-texturing or other blending functions.

Pixel engine 700 stores color and depth data into an embedded (on-chip) DRAM (1 TSRAM) frame buffer memory 702 including a color frame buffer and a depth buffer. Pixel engine 700 performs depth (z) compare (700*a*) and pixel blending (700*b*). Z compares 700*a'* can also be performed at an earlier stage in the graphics pipeline 180 (i.e., before texturing) depending on the rendering mode currently in effect (e.g., if alpha thresholding is not required). However, it is desirable, although not necessary, to provide z buffering at the end of the pipeline. The pixel engine 700 includes a copy operation 700*c* that periodically writes on-chip frame buffer 702 to main memory 112 for access by display/video interface unit 164. This copy operation 700*c* can also be used to copy embedded frame buffer color or z information to textures in the main memory 112 for dynamic color or z texture synthesis. Anti-aliasing and other filtering can be performed during the copy-out operation. The color frame buffer output of graphics pipeline 180 (which is ultimately stored in main memory 112) is read each frame by display/video interface unit 164. Display controller/video interface 164 provides digital RGB pixel values for display on display 102.

Additional details of example graphics system 50 may be found in U.S. Pat. Nos. 6,707,458 and 6,609,977, the contents of each of which are incorporated herein in their entirety.

Example Video Game

The discussion below is in the context of an example first person ghost game that may be played using example graphics system 50. In an illustrative embodiment, the instructions for this video game are stored on a storage medium 62 that is operatively coupled to graphics system 50. Of course, the techniques and methods described herein are not limited to the example ghost game or the example graphics system and it will be readily recognized that these techniques and methods are readily applicable to many different types of video games and graphics systems. By way of example, not limitation, other graphics systems having a programmable texture combiner and the ability to capture frame and depth buffers to textures may be used to implement some of the visual effects described herein. These other graphics systems are not limited to console systems as shown in FIG. 1 and may include hand-held devices, personal computers and emulators running on hand-held devices or personal computers. For example, an emulator may provide a hardware and/or software configuration (platform) that is different from the hardware and/or software configuration (platform) of graphics system 50. The emulator system might include software and/or hardware components that emulate or simulate some or all of the hardware and/or software components of the system for which the application software was written. For example, the emulator system could comprise a hand-held device or a general purpose digital computer such as a personal computer which executes a software emulator program that simulates the hardware and/or firmware of graphics system 50.

The example ghost game is a first person game in which the player plays the game as if looking out of his or her own eyes. In the example ghost game, players search for a physical body, which is mysteriously being kept alive somewhere in an enormous compound. Players can explore the compound as a ghost which can travel through the human world virtually unseen, using its abilities to slip through cracks, interfere with electronics, move objects and the like. The ghost can "possess" a plurality of different characters or objects ("hosts"), thereafter using the hosts' weapons, equipment, skills, and even memories, to complete the goals. For example, the ghost may possess a soldier character in order to fight other characters or may possess an animal such as a dog or mouse to gain access to areas that might be inaccessible to human characters. The ghost may also possess objects such as weapons or machine controls so that these objects can be controlled to achieve game objectives. Thus, in the example game, the player is a ghost and the ghost "possesses" or inhabits hosts such as game characters and game objects in order to accomplish game objectives. When the ghost possesses a host, the game view is shifted to the view of the possessed host.

Figure 6A:
FIGS. 6A-6C show game characters having auras.
Figure 6B:
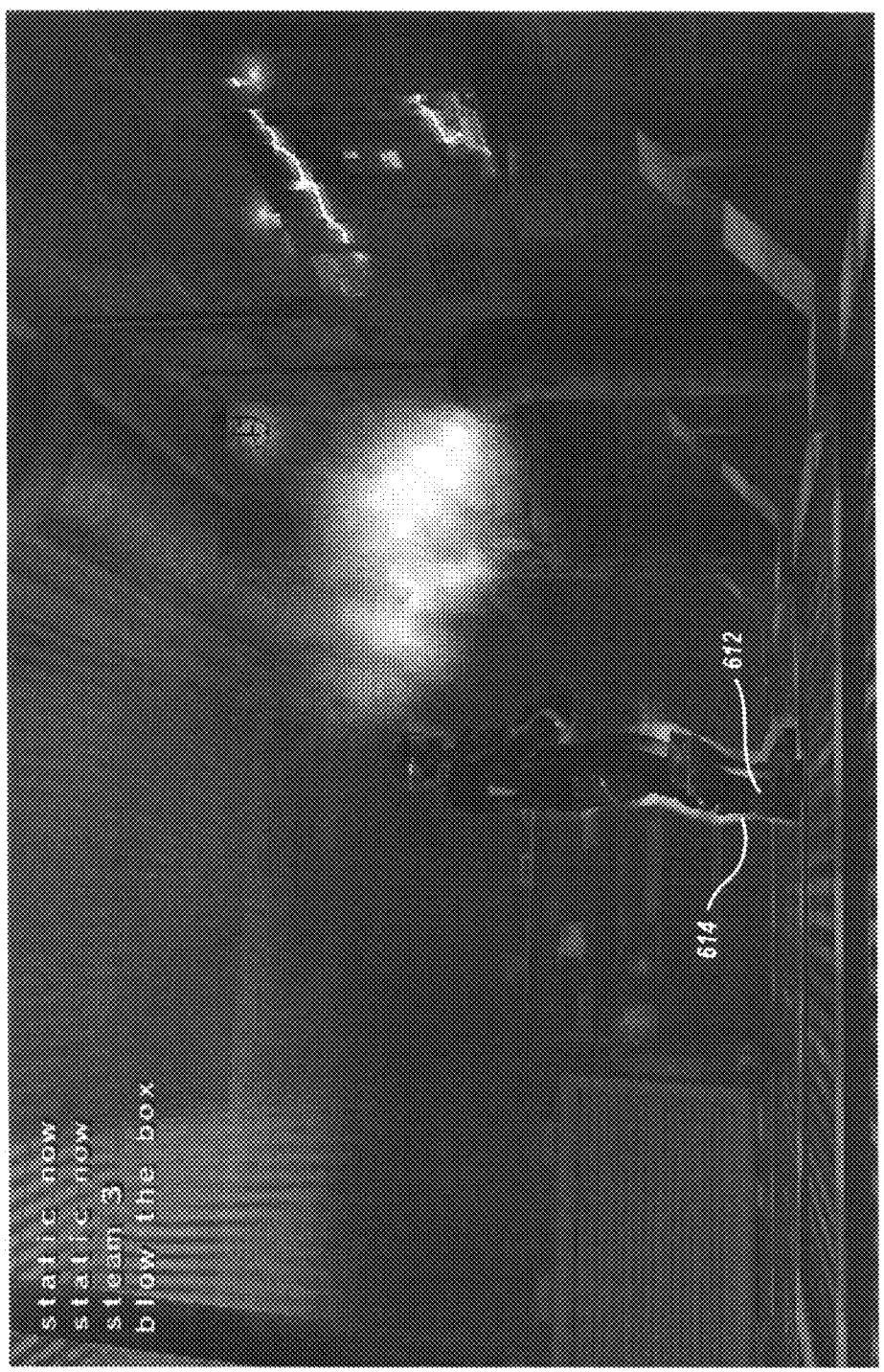
Figure 6C:
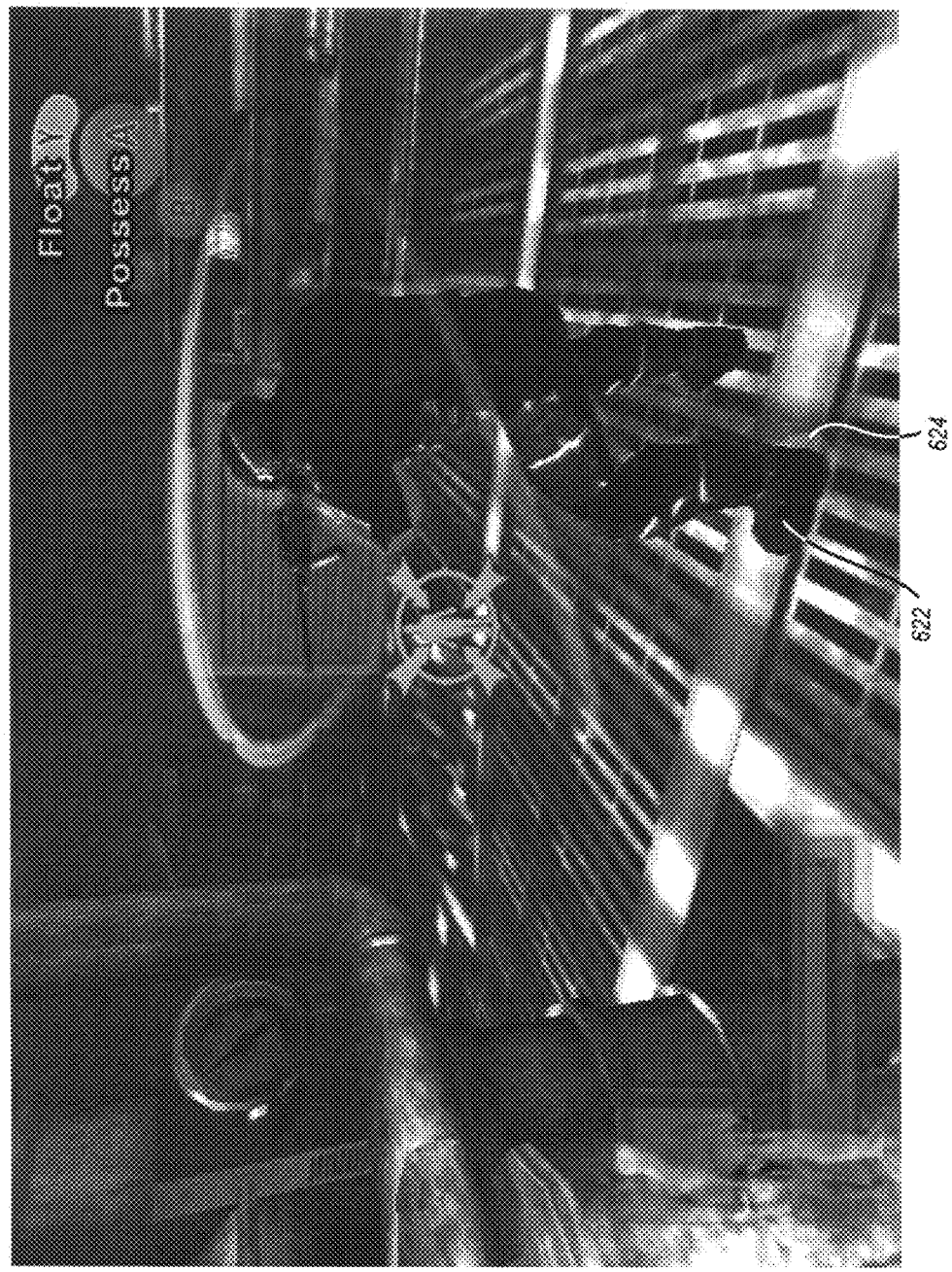

Generally speaking, the ghost may possess a host when the host has a predetermined "aura." In the case of game characters, these auras indicate the emotional state(s) of the characters. In the example game, when the player is in ghost form, the ghost can see the emotional states of potentially possessible characters by the colors of their auras. Auras visually surround at least part of a possessible host. FIG. 6A shows a character 602 having a white aura 604; FIG. 6B shows a character 612 having a yellow aura 614; and FIG. 6C shows a character 622 having a red aura 624. As noted above, the color of a character's aura indicates the emotional state of that character. For example, the white aura 604 indicates that character 602 has a confident emotional state. The yellow aura 614 indicates that character 612 has a wary emotional state. The red aura 624 indicates that character 622 has a frightened emotional state.

Of course, these colors and emotional states are provided by way of example, not limitation. In addition, although three emotional states are described, different numbers of emotional states may be used. For example, characters may be limited to having either confident or frightened emotional states and auras of two different colors may be used to represent these two different emotional states. Alternatively, in the case of two different emotional states, an aura may be provided only when the character is in one or the other of the emotional states. In a still further example, different characters may have different numbers and/or types of auras.

The ghost can possess a host by frightening the potential character to change its aura from white or yellow to red. By way of example, the potential host may be character 612 shown in FIG. 6B who may initially have a white (confident) aura. The ghost may cause steam to be emitted from a steam pipe as shown in FIG. 6B by, for example, possessing or inhabiting the steam pipe. This will cause the aura of character 612 to become yellow, indicating that the character is now in a wary emotional state. The inability of the character to stop the steam emission or escape from the chamber in which the steam is being emitted may subsequently cause the aura to become red, at which point the ghost may possess the character. By way of further example, a potential host may be a character may be typing at a laptop computer. The unseen ghost may, for example, possess or inhabit the laptop and thereafter close or turn off the laptop while the character is typing, frightening the character and changing the color of the character's aura from white to yellow. The character may then try to escape from the room in which the character was working. If the ghost has locked the door, the character's aura may change from yellow to red. At this point, the ghost may posses the character.

The character preferably maintains a yellow or red aura only for a predetermined period of time. For example, if the steam emission were to be stopped after the aura of character 612 turned yellow, the aura would preferably revert to white after some predetermined time period (e.g., ten seconds). Similarly, a red aura would revert back to a yellow aura after a predetermined period of time.

As noted above, objects such as weapons, computers, steam meters, etc. may also be possessed in order to frighten host characters. In some cases, these objects may always be possessible, in which case they could always have a red aura or could have no aura at all. In other cases, certain objectives and/or goals may need to be achieved in order to make an object possessible. In this case, the aura of the object may be changed from one color (e.g., white) to another color (e.g., red) to indicate that the object is possessible after the objectives or goals are attained. Thus, in the case of objects, auras would not typically be indicative of an "emotional state", but rather whether the object was possessible or not.

Possession may be accomplished in one example implementation by selecting the character to be possessed using the positioning controls of the controller 52 to position a cursor or other indicator on the character and then pressing a "possess" key of the controller. As shown in FIG. 6C, for example, the upper right-hand portion of the game display may provide guidance information which indicates that pressing the "A" key on the controller 52 will cause the ghost to possess character 622. Guidance information may be context sensitive so that it is relevant to actions currently available to the player. Thus, guidance information for possessing a host may be displayed when there is a host capable of being possessed. Guidance information for "dispossessing" a host may be displayed when a host is possessed.

When the ghost possesses a host, the game view is shifted to that of the possessed host. That is, the player sees the game world through the eyes or viewpoint of the possessed host. In order to allow the player to feel more like the host that has been possessed, the example video game enables the player to see the world based on the vision characteristics of the possessed host. For example, dogs have more rods than cones in the retina. Thus, dogs generally have good night vision and motion detection. The smaller number of cones limits color vision to two areas of the visible spectrum, red-yellow-green and blue-violet. Thus red, orange and yellow-green all look much the same to a dog but can be distinguished from blue or violet. The colors between green and blue are likely seen as gray. The field of vision of dogs is much greater than that of humans, 250 to 270 degrees as compared to 170 to 180 degrees. Thus, if the ghost possesses a dog, a visual effect is used so that the player sees the world as someone, for example, that has red-green color blindness and a wide field of vision would see it. By way of further example, the vision of a mouse is, among other things, blurry. Thus, if the ghost possesses a mouse, a visual effect is used so that the player sees the world as someone with blurry vision would see it. In the case of possessing the dog, graphics system 50 may be controlled by the program for the video game to combine the red and green channels to simulate the red-green color blindness. In the case of a mouse, graphics system 50 may be controlled by the program for the video game use a blur to blur the world to simulate near-sightedness. The game program for the video game may control graphics system 50 to use additional effects such as enhancing or reducing contrast, performing image warping, texturing, lighting, fog and the like.

Figure 7A:
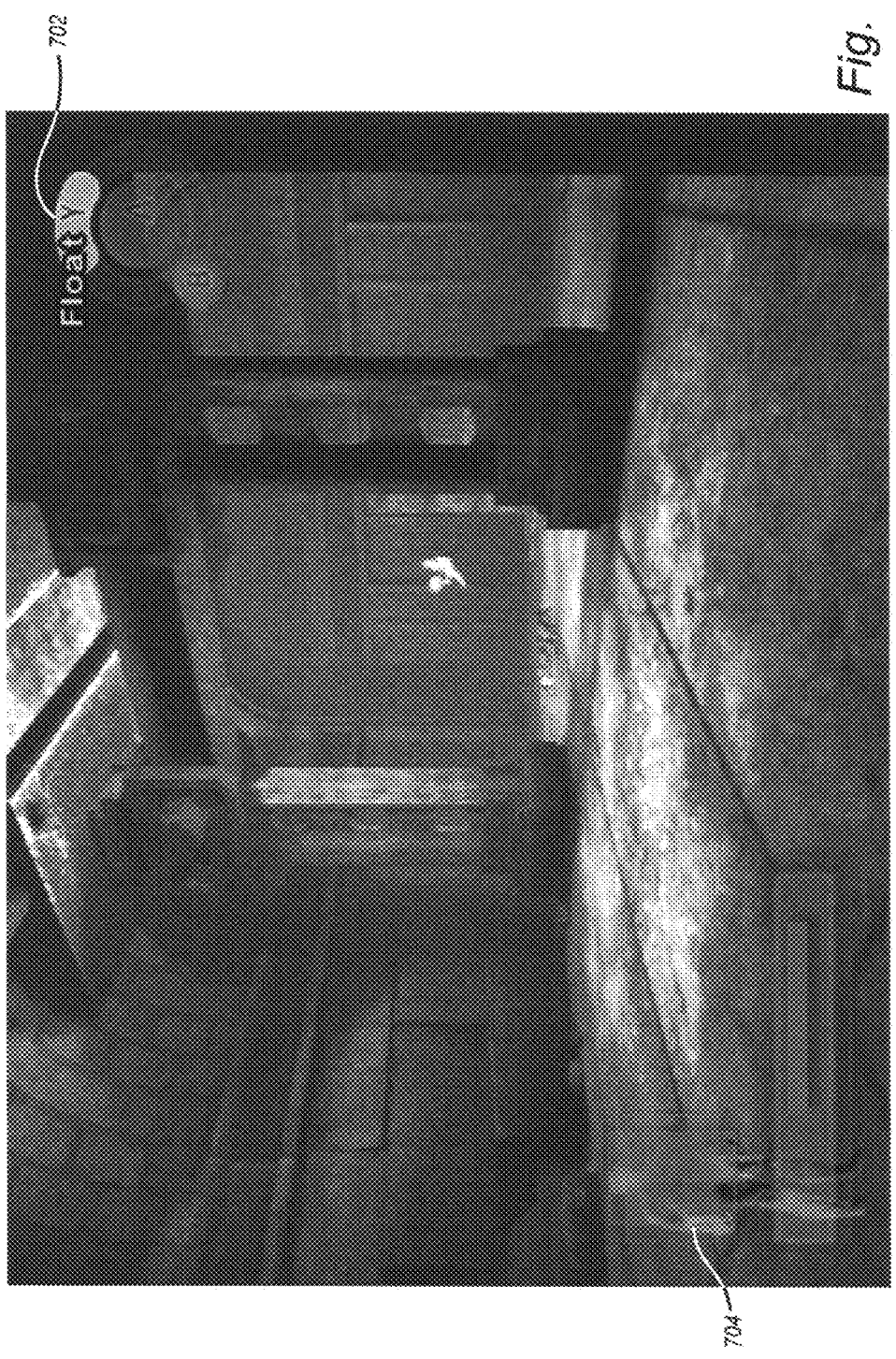
FIGS. 7A-7D show the same scene viewed using different visual effects.

FIGS. 7A-7D show the same scene in the game world as it is viewed by different possessed hosts. FIG. 7A shows the scene as viewed by the ghost. The vision of the ghost is characterized in the example implementation by high contrast, some blurriness, a lack of color and overbrightness. Guidance information 702 is provided in the upper right-hand potion of the screen and indicates that the ghost can be made to float by pressing a "Y" key on controller 52. The lower left-hand portion of the screen includes a three-dimensional ghost character 704 which helps the player feel more like the character and see what the character is doing. Character 704 is fully animated and its movements and position permit the player "view" himself/herself during game play.

Figure 7B:
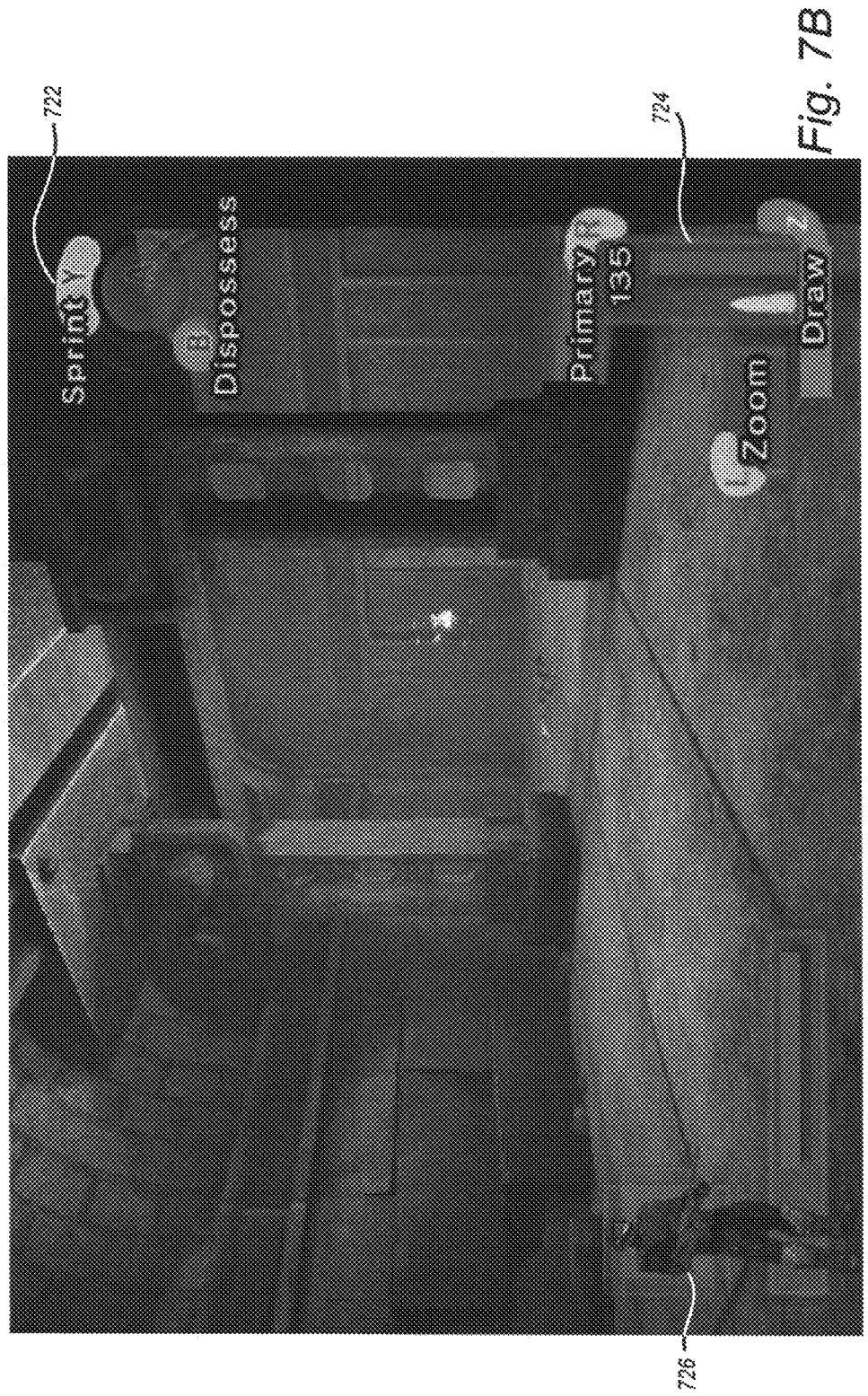

In FIG. 7B, the ghost has possessed a guard character and FIG. 7B shows the scene of FIG. 7A as viewed by the guard. The guard's view is a normal human view and thus this view may be considered to be without any visual effects. Of course, it is possible to provide the guard with certain vision characteristics such as color blindness, near-sightedness, far-sightedness and the like if desired. In this case, a visual effect may be applied to implement these characteristics. Guidance information 722 is provided in the upper right-hand portion of the screen. Guidance information 722 indicates that the guard character may be made to sprint by depressing the "Y" key on controller 52 and that the ghost may be made to dispossess the guard character (returning to the ghost character) by depressing the "B" key on controller 52. The screen of FIG. 7B includes additional guidance information 724 at the lower right-hand portion thereof. The lower left-hand portion of the screen includes a fully animated, three-dimensional image 726 of the guard character. The movements and position of image 726 let the player view the actions of the guard character during game play.

Figure 7C:
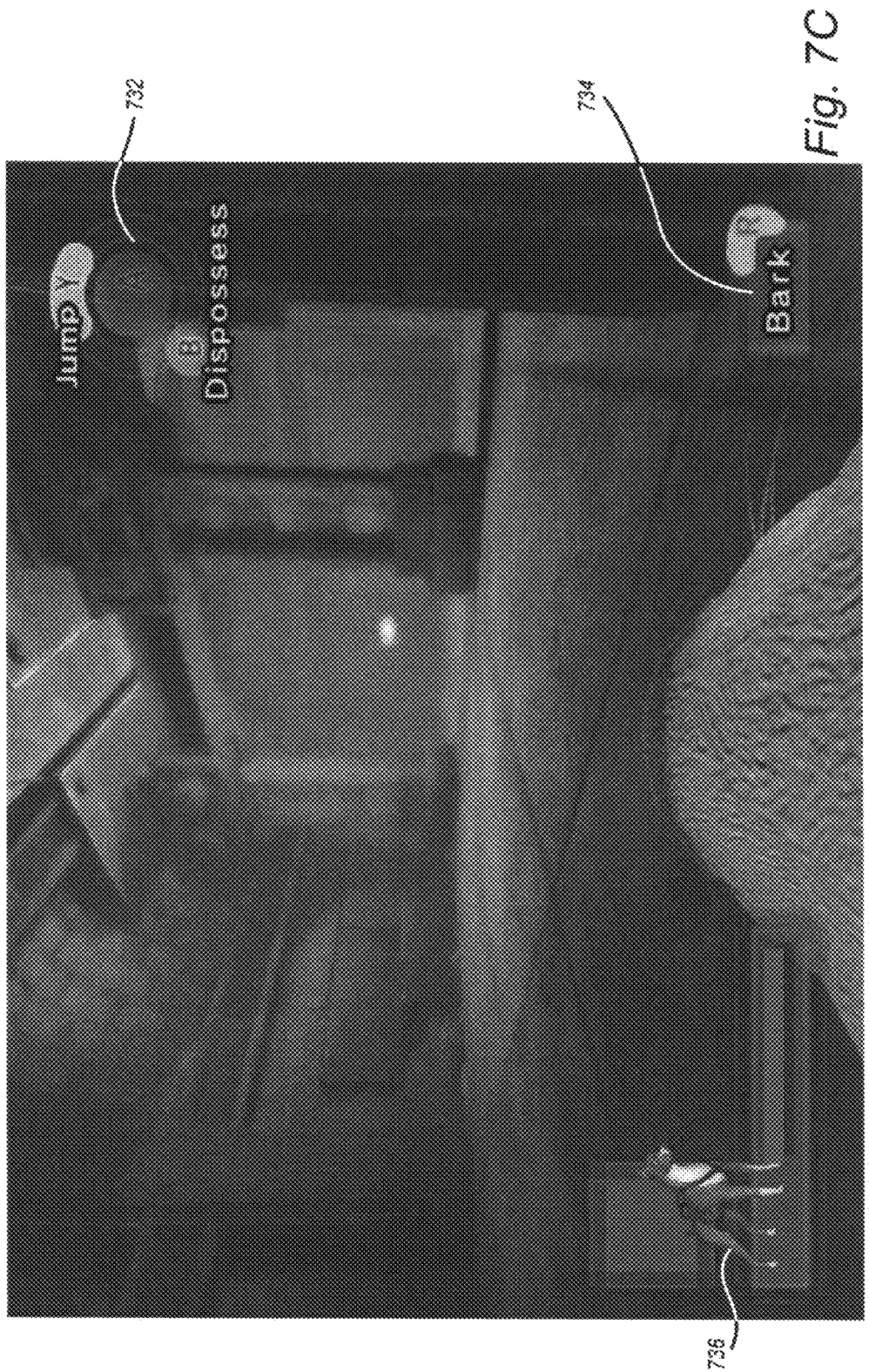

In FIG. 7C, the ghost has possessed a dog character and FIG. 7C shows the scene of FIG. 7A as viewed by the dog. FIG. 7C shows the dog's nose as it would be seen by the dog. The vision of the dog in the example implementation is characterized by a wider field of view than, for example, the guard view) and red-green color blindness. Guidance information 732 is provided in the upper right-hand portion of the screen. This guidance information indicates that the dog may be made to jump by pressing the "Y" key on controller 52 and that the ghost may be made to dispossess the dog by pressing the "B" key on the controller. Guidance information 734 at the lower right-hand portion of the screen indicates that the dog may be made to bark by pressing an "R" key on controller 52. The lower left-hand portion of the screen includes a fully animated, three-dimensional image 736 of the dog character. The movements and position of image 736 let the player view the actions of the dog character during game play.

Figure 7D:
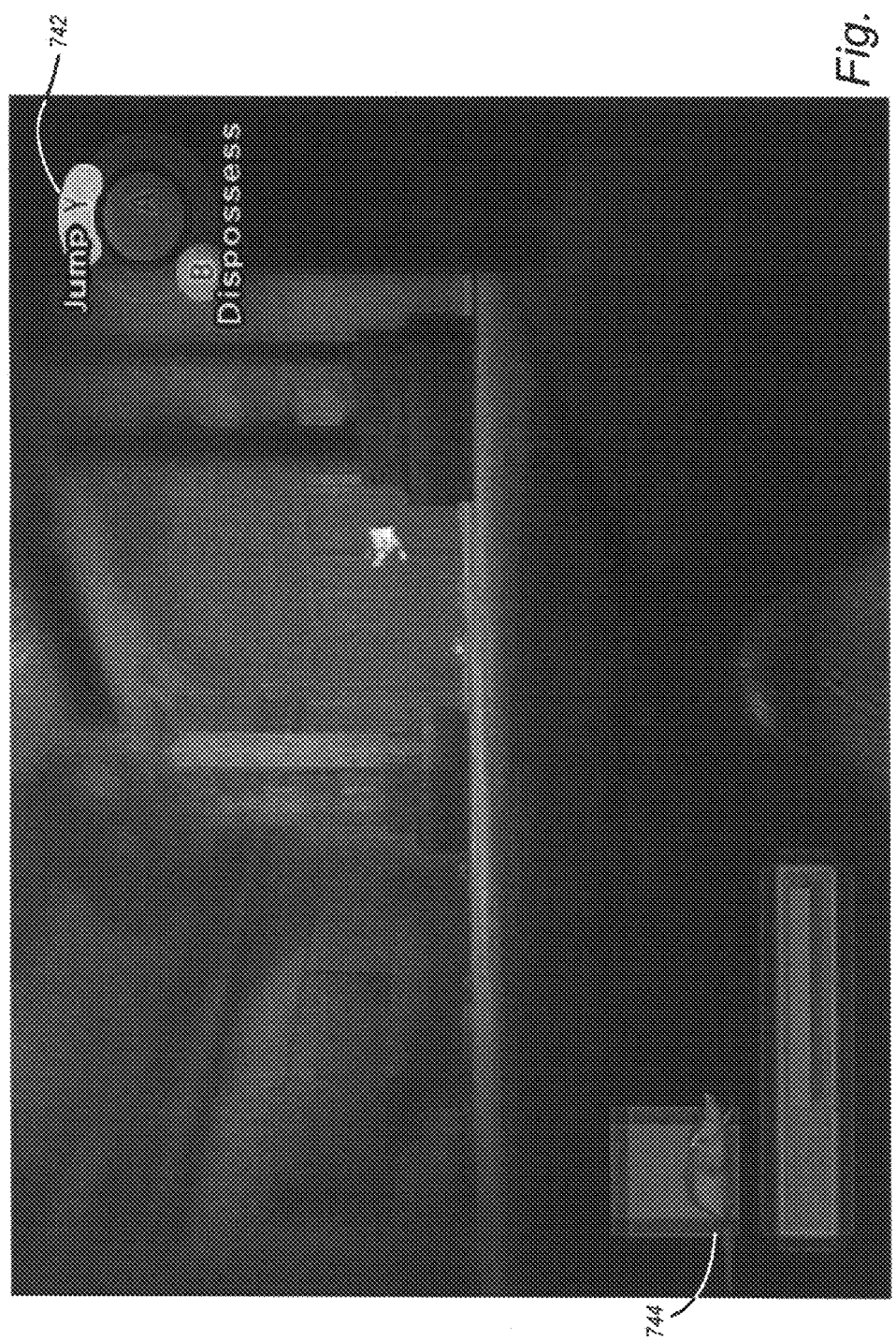

In FIG. 7D, the ghost has possessed a mouse and FIG. 7D shows the scene of FIG. 7A as viewed by the mouse character. The vision effect for the mouse is characterized in this example implementation by a very monochromatic greenish view, a wide field of view and blurriness. Guidance information 742 is provided at the upper right-hand portion of the screen. This guidance information indicates that the mouse may be made to jump by pressing the "Y" button on controller 52 and that the ghost may dispossess the mouse by pressing the "B" key on controller 52. The lower left-hand portion of the screen includes a fully animated, three-dimensional image 744 of the mouse character. The movements and position of image 744 let the player view the actions of the mouse character during game play.

Figure 7E:
FIGS. 7E-7G show different visual effects for a turret game object.

In FIG. 7E, the ghost has possessed a gun turret and FIG. 7E shows a scene in the game world as viewed from the turret. This view is provided with an overlay showing various turret controls (locked, enable, fire, etc.). The scene may be otherwise viewed with human vision characteristics. Guidance information 752 is provided at the upper right-hand portion of the screen showing that the ghost may dispossess the turret by pressing the "B" key on controller 52. Guidance information 754 is provided at the lower right-hand portion of the screen and indicates that the player may zoom the turret view by pressing the "L" key on controller 52. The lower left-hand portion of the screen includes a fully animated, three-dimensional image 756 of the turret object. The movements and positioning of image 756 let the player "view" the actions of the turret during game play.

Figure 7F:
Figure 7G:
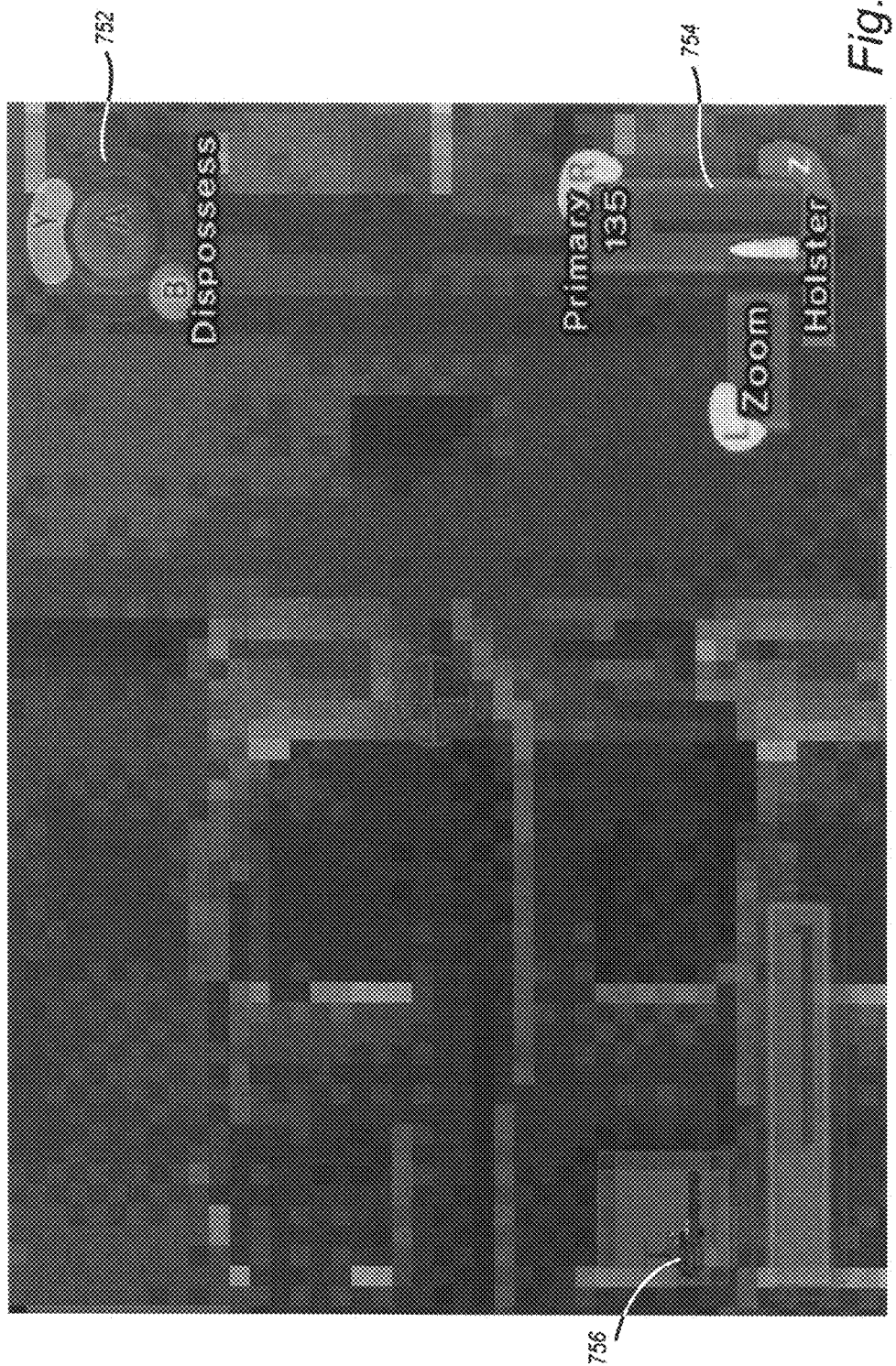

FIGS. 7F and 7G show the effect of using the zoom implemented by pressing the "L" key on the controller from the view of FIG. 7E. As shown in these Figures, the zoomed-in view becomes pixelated and visual effects are provided for implementing this pixelated view.

In an example implementation, the software program for the example video game is stored on storage medium 62. The program includes data and/or instructions for each host that determines the visual effects to be implemented when the ghost possesses that host. Thus, in the case of the dog, the program contains data and/or instructions, for example, for combining the red and green color channels and for specifying the size of the field of view to be used. In the case of the mouse, the program contain data and/or instructions that specify, among other things, blur the scene to simulate the mouse's blurry vision.

In the example ghost video game running on graphics system 50, certain of the visual effects are "post effects" applied after three-dimensional rendering is complete. More specifically, the frame buffer and/or the z-buffer (depth buffer) are captured to a texture. Generally speaking, if z-buffering is enabled, a depth value as well as a color value is stored for each pixel. Depth can be thought of as the distance from the viewer's eye to the pixel. Whenever a drawing routine tries to update a pixel, it first checks the current pixel's "depth" or "z-value" and will only update that pixel with new values if the new pixel is closer than the current pixel. The region of memory that stores the z-values is referred to as the z-buffer. The captured texture is sent to the game system's graphics processor where it is affected by the Texture Environment (TEV) stages. The TEV stage parameters determine how the texture, depth buffer and other textures are blended to produce various visual effects. Blending of textures in the context of graphic system 50 is described in U.S. Pat. No. 6,664,958, the contents of which are incorporated herein by reference.

The graphics pipeline 180 of the example graphics system 50 supports combining a color texture and a depth ("z") texture to facilitate image-based rendering in which the frame buffer 702 is a composite of smaller color and depth images, like sprites with depth. FIG. 8 shows an example z texturing operation using a color texture $t_c$ and a z texture $t_z$, to form a sprite with depth. In this context, a sprite may be regarded as a texture map or image with or without alpha (transparency) rendered onto a planar surface. The corresponding z texture $t_z$ provides a z displacement or an absolute depth for each image element (texel) in the texture map or image—which z displacements can be different for each different image element. In the FIG. 8 simplified diagram, texture coordinate generation 500(1) performed by transform unit 300 generates texture coordinates used to look up and map color texture $t_c$. The resulting color texels (which may be filtered using standard texture filtering techniques) are blended or otherwise applied to a primitive surface by texture environment unit 600. The resulting pixels are stored in an embedded color frame buffer 702c for imaging and/or further processing.

Texture coordinate generation 500(1) also generates texture coordinates for use in z texture mapping/resampling. Texture memory 502 can store z texture $t_z$ in a variety of different formats, and texture unit 500 can look up and map z texture $t_z$ using the same or different texture coordinates used for color texture mapping (e.g., using a non-linear or non-uniform mapping). The resulting z texels output by texture unit 500 are applied to a z blender 600z. Z blender 600z blends the z texel depth values with the depth of the surface the z texture is being mapped onto or replaces the surface depth with the z texel depth values. The pixel depth values resulting from the z blending operation are applied to a hidden surface removal operation using z compare 700a (see FIG. 5) operating in conjunction with an embedded z buffer 702z. The hidden surface removal operation in conjunction with the z buffer allows the z texture $t_z$ to control whether parts of the texture mapped image are occluded by other objects in the scene.

FIG. 9A shows an example color texture $t_c$, for a sprite with depth and FIG. 9B shows an example corresponding z texture $t_z$ for the sprite with depth. The color texture $t_c$ in FIG. 9A provides a two-dimensional image of a bush. Example z texture $t_z$ of FIG. 9B provides a two-dimensional absolute or displacement map of this same bush. In FIG. 9B, for example, $z_1$ corresponding to the depth (displacement) $z_1$ of a front part of the bush can be defined having a z value that is closer to the selected viewpoint than depth (displacement) values $z_2$, $z_3$, $z_4$, $z_5$ and $z_6$ corresponding to rearward portions of the bush. Using this auxiliary z texture depth information, it becomes possible for other objects in the scene to occlude parts of the FIG. 9A color image of the bush while being occluded by other parts of this color texture image. For example, a bird defined at a depth position between $z_2$ and $z_3$ could appear to "fly through" the bush. The front portions of the bush $z_1$, $z_2$ could occlude the bird as it passes "behind" those portions of the bush. In contrast, the bird could occlude portions $z_3$, $z_4$, $z_5$ and $z_6$ of the bush as it flies "in front of" those portions of the bush. Hence, a substantial degree of occlusion complexity can be realized at low cost using mechanisms in system 50 shared with color texturing operations. While the FIG. 9B example z texture shows depth encoding by region, this is accomplished in the example embodiment by storing a different depth (displacement) value in each of the various z texel locations of the z texture to provide arbitrarily complex occlusion visualization.

The above-described concepts for texturing can be used to implement certain of the visual effects for the possessed hosts described above. For example, the concepts can be used to implement the visual effects for the ghost, the dog and the mouse. Thus, for example, near-sightedness and far-sightedness can be realized by using textures that blur objects in accordance with distance from the viewer.

Figure 10:
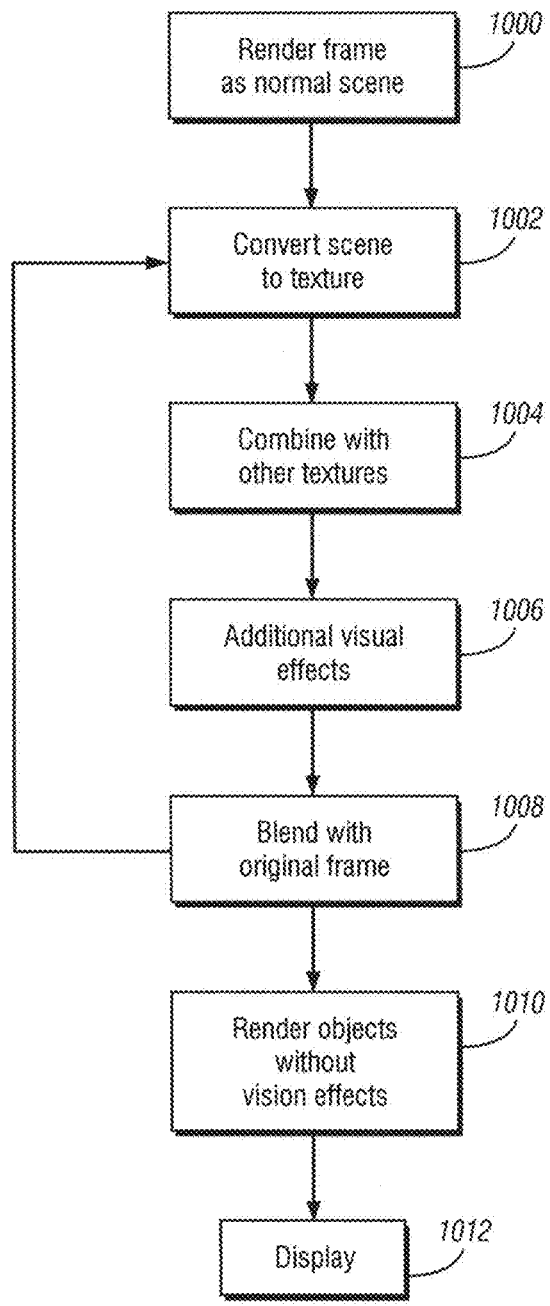
FIG. 10 is a flowchart showing steps for implementing vision filters.

The methodology for generating the vision effects described above is described below with reference to FIG. 10. At ST 1000, the frame is rendered as a normal scene in the frame buffer and/or z-buffer. The scene may have character-specific view parameters such as field of view and possibly depth, fog and color. At ST 1002, the scene is made into a texture using the frame buffer and/or z-buffer. At ST 1004, this texture is optionally combined with other textures and at ST 1006 certain other visual effects (e.g., combining color channels) may be implemented. For example, in the case of a vision effect for dog character, the red and green color channels may be combined to simulate a dog's red-green color blindness. The result of ST 1006 is then blended with the original frame buffer at ST 1008. As indicated in FIG. 10, this process is optionally repeated one or more times. Any display objects without vision effects are then rendered at ST 1010 and the result is displayed at ST 1012.

As mentioned with reference to ST 1010, certain display objects may be rendered without visual effects, for example, to facilitate game play. Suppose a game included a stop light. In the visual effects for a dog character, the stop light would appear as gray rather than red, perhaps confusing the player. Accordingly, this stop light may be rendered without visual effects so that it appears as red even though the rest of scene is viewed with the red-green color blindness. The auras of hosts may also be rendered without the visual effects applied thereto. Of course, the game developer may nonetheless wish to apply effects to such objects in order to complicate game play for a player.

The video game may be designed to permit the user to change certain effects prior to or during game play. For example, in the case of the telescope object, the player may be provided with various filter options (e.g., infrared, heat mapping, X-ray, nightvision, etc.) for filtering what is being viewed. When the user, chooses one of these filters, the game program causes the scene to be viewed taking into account the use of the filter. Also the video game may permit the user to specify certain aspects of the vision of one or more characters or objects prior to or during game play. For example, the player may be able to set the size of the field of view, the degree of near-sightedness, far-sightedness, etc. of one or more characters.

The visual effects may be time dependent. Thus, the visual effects may change over time while the user possesses a host. For example, a character that is waking up may have vision that is initially blurry and then clears up as the character becomes more awake. Similarly, as a game character tires, his/her vision may become more blurry.

Figure 11:
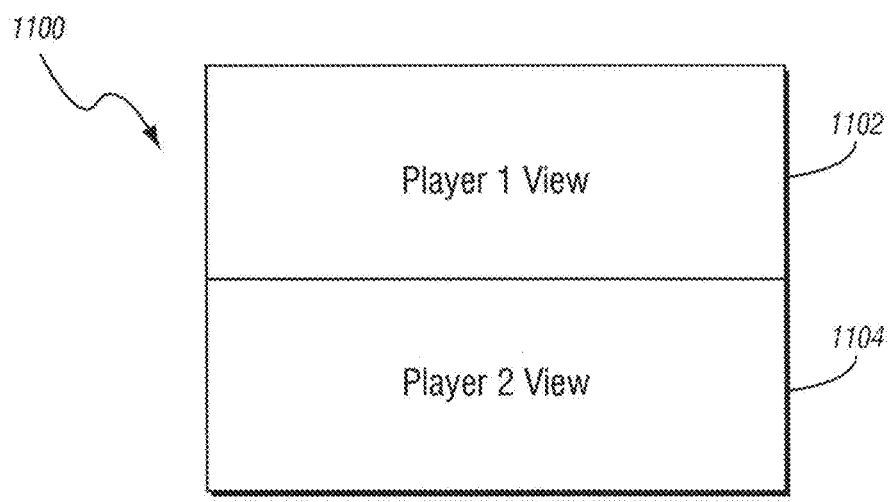
FIG. 11 schematically shows a split screen game display using vision filters.

The visual effects may also be used in a multi-player split screen mode as shown in FIG. 11. In this FIG. 11, the upper portion 1102 of the screen 1100 is the player 1 view and the lower portion 1104 of the screen 1100 is the player 2 view. Each of these portions 1102 and 1104 may simultaneously utilize different visual effects depending on the respective characters possessed by the different players.

The concepts described above are not limited to visual effects. That is, other effects may be used so that the player can experience the game world as the possessed host. For example, when a ghost possesses a host, audio effects (e.g., pitch, volume, stereo, frequency range of sounds that can be heard, etc.) may be used so that the player can experience sounds like the possessed host would experience those sounds. Thus, if the host is a dog, audio effects may be used to convey a sense of how a dog hears. For example, for low frequency sounds, humans hear as well or better than dogs. Dogs, however, hear higher frequencies much better than humans. This enables them to hear the ultrasonic sounds of birds, mice, and bats. Similarly, if the host is a mouse, other audio effects may be used to convey a sense of how a mouse hears. These audio effects may be provided in combination with or separately from the above-described vision effects. As with the visual effects, the audio effects may be time-dependent and/or may be at least partly user configurable. In addition, certain sounds may be unaffected by the audio effects.

By way of further example, the vibration devices in the controllers may be used to convey to a player how a particular host might experience certain forces applied thereto. For example, a mouse and a human would sense the same force differently and the game system can take these differences into account when generating tactile sensations. As with the visual and audio effects, the tactile effects may be time-dependent and/or may be at least partly user configurable. In addition, certain forces may be unaffected by the tactile effects.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A non-transitory computer readable medium storing program instructions which, when executed by one or more processors, provide a video game comprising:
   a game world; and
   audio effects for producing sound for a sound-producing event in a game world scene in dependence on an intrinsic characteristic ascribed to the hearing of a game character in the game world so that sound produced for the sound-producing event is heard by a player as if the player had the intrinsic hearing characteristic ascribed to the game character,
   wherein first and second game characters in the game world each have a different intrinsic hearing characteristic ascribed thereto so that different sound is produced for the same sound-producing event in dependence on whether the sound is to be heard by the player as if the player had the intrinsic hearing characteristic ascribed to the first game character or to the second game character.

2. A non-transitory computer readable medium storing program instructions which, when executed by one or more processors, provide a video game comprising:
   a game world; and
   tactile effects for producing tactile output for a tactile-producing event in a game world scene in dependence on an intrinsic tactile-response characteristic ascribed to a game character in the game world so that the tactile output produced for the tactile-producing event is felt by a player as if the player had the intrinsic tactile-response characteristic ascribed to the game character,
   wherein first and second game characters in the game world each have a different intrinsic tactile-response characteristic so that different tactile outputs are produced for the same tactile-producing event in dependence on whether the tactile producing event is to be felt by the player as if the player had the intrinsic tactile-response characteristic ascribed to the first game character or to the second game character.

3. An apparatus for use in controlling a progress of a game, the apparatus comprising: a memory that stores a program; and one or more processors configured to access the program from the memory, and to execute the program to enable a game to be interactively played in accordance with player interactions, the processor being configured to: generate a game world and produce sound for a sound-producing event in the game world in dependence on an intrinsic characteristic ascribed to the hearing of a character in the game world so that the sound produced for the sound-producing event is heard by a player as if the player had the hearing characteristic ascribed to the character, wherein first and second game characters in the game world each have a different intrinsic hearing characteristic ascribed thereto so that different sound is produced for the same sound-producing event in dependence on whether the sound is to be heard by the player as if the player had the intrinsic hearing characteristic ascribed to the first game character or to the second game character.

4. An apparatus for use in controlling a progress of a game, the apparatus comprising: a memory that stores a program; and one or more processors configured to access the program from the memory, and to execute the program to enable a game to be interactively played in accordance with player interactions, the processor being configured to: generate a game world including a character and produce tactile output for a tactile-producing event in a game world scene in dependence on an intrinsic tactile-response characteristic ascribed to a game character in the game world so that the tactile output produced for the tactile- producing event is felt by a player as if the player had the intrinsic tactile-response characteristic ascribed to the game character, wherein first and second game characters in the game world each have a different intrinsic tactile-response characteristic so that different tactile outputs are produced for the same tactile-producing event in dependence on whether the tactile producing event is to be felt by the player as if the player had the intrinsic tactile-response characteristic ascribed to the first game character or to the second game character.

* * * * *